US012598127B2

(12) United States Patent
Choudhary et al.

(10) Patent No.: US 12,598,127 B2

(45) Date of Patent: Apr. 7, 2026

---

(54) TESTING WIRELESS NETWORK BY USING MASTER-SLAVE DEVICES

(71) Applicant: Rakuten Symphony, Inc., Tokyo (JP)

(72) Inventors: Sachin Choudhary, Indore (IN); Raja Rathore, Indore (IN); Sandeep Rathor, Indore (IN); Arpit Gangwal, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 667 days.

(21) Appl. No.: 18/041,508

(22) PCT Filed: Dec. 28, 2022

(86) PCT No.: PCT/US2022/054118

§ 371 (c)(1),
(2) Date: Feb. 13, 2023

(87) PCT Pub. No.: WO2024/102153

PCT Pub. Date: May 16, 2024

(65) Prior Publication Data

US 2025/0080446 A1    Mar. 6, 2025

(30) Foreign Application Priority Data

Nov. 11, 2022    (IN) ............................. 202221064597

(51) Int. Cl.
*H04L 43/50*      (2022.01)
*H04W 24/02*      (2009.01)

(52) U.S. Cl.
CPC ............. *H04L 43/50* (2013.01); *H04W 24/02* (2013.01)

(58) Field of Classification Search
CPC ...... H04L 43/50; H04W 24/02; H04W 24/04; H04W 24/10
See application file for complete search history.

(56) References Cited

U.S. PATENT DOCUMENTS

2018/0131596 A1* 5/2018 Huh .......................... H04L 43/12
2023/0140156 A1* 5/2023 Swaans ................... H04B 17/17
                                   324/764.01

OTHER PUBLICATIONS

Written Opinion of the International Searching Authority issued May 2, 2023, for International Application No. PCT/US22/54118. International Search Report issued May 2, 2023, for International Application No. PCT/US22/54118.

* cited by examiner

*Primary Examiner* — Gbemileke J Onamuti
(74) *Attorney, Agent, or Firm* — Sughrue Mion, PLLC

(57) ABSTRACT

Embodiments herein provide a method for testing wireless network by a master electronic device. Further, the method includes simultaneously starting at least one test on each slave electronic device of a plurality of slave electronic devices. Further, the method includes periodically receiving KPIs information associated with the at least one test while the at least one test is on-going on the particular path by each slave electronic device of the plurality of slave electronic devices. Further, the method includes displaying the KPIs information associated with the at least one test while the at least one test on the particular path is on-going in each slave electronic device of the plurality of slave electronic devices. Further, the method includes simultaneously stopping the at least one test on each slave electronic device of the plurality of slave electronic devices.

20 Claims, 9 Drawing Sheets

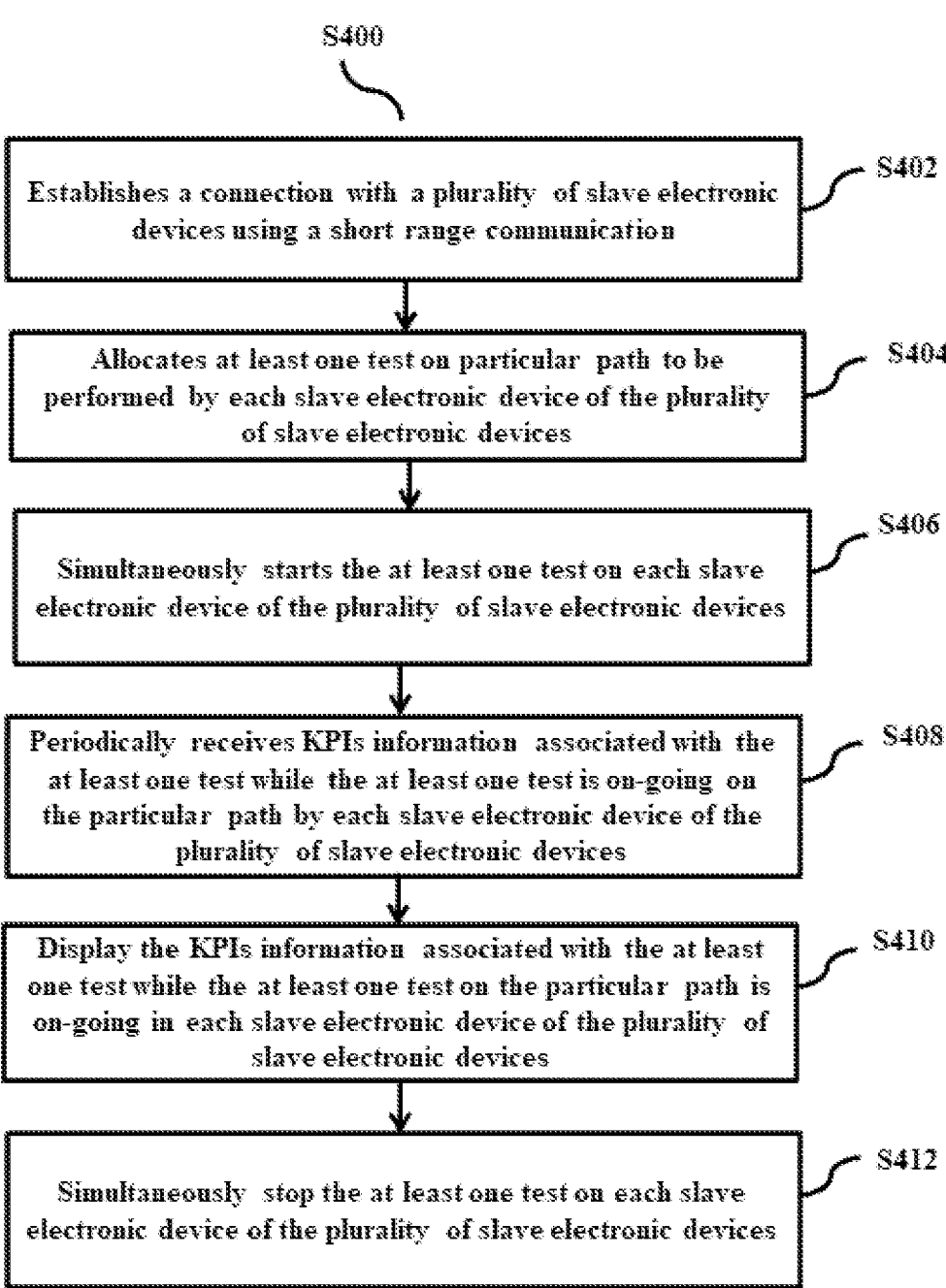

S400

Establishes a connection with a plurality of slave electronic devices using a short range communication — S402

Allocates at least one test on particular path to be performed by each slave electronic device of the plurality of slave electronic devices — S404

Simultaneously starts the at least one test on each slave electronic device of the plurality of slave electronic devices — S406

Periodically receives KPIs information associated with the at least one test while the at least one test is on-going on the particular path by each slave electronic device of the plurality of slave electronic devices — S408

Display the KPIs information associated with the at least one test while the at least one test on the particular path is on-going in each slave electronic device of the plurality of slave electronic devices — S410

Simultaneously stop the at least one test on each slave electronic device of the plurality of slave electronic devices — S412

FIG. 4

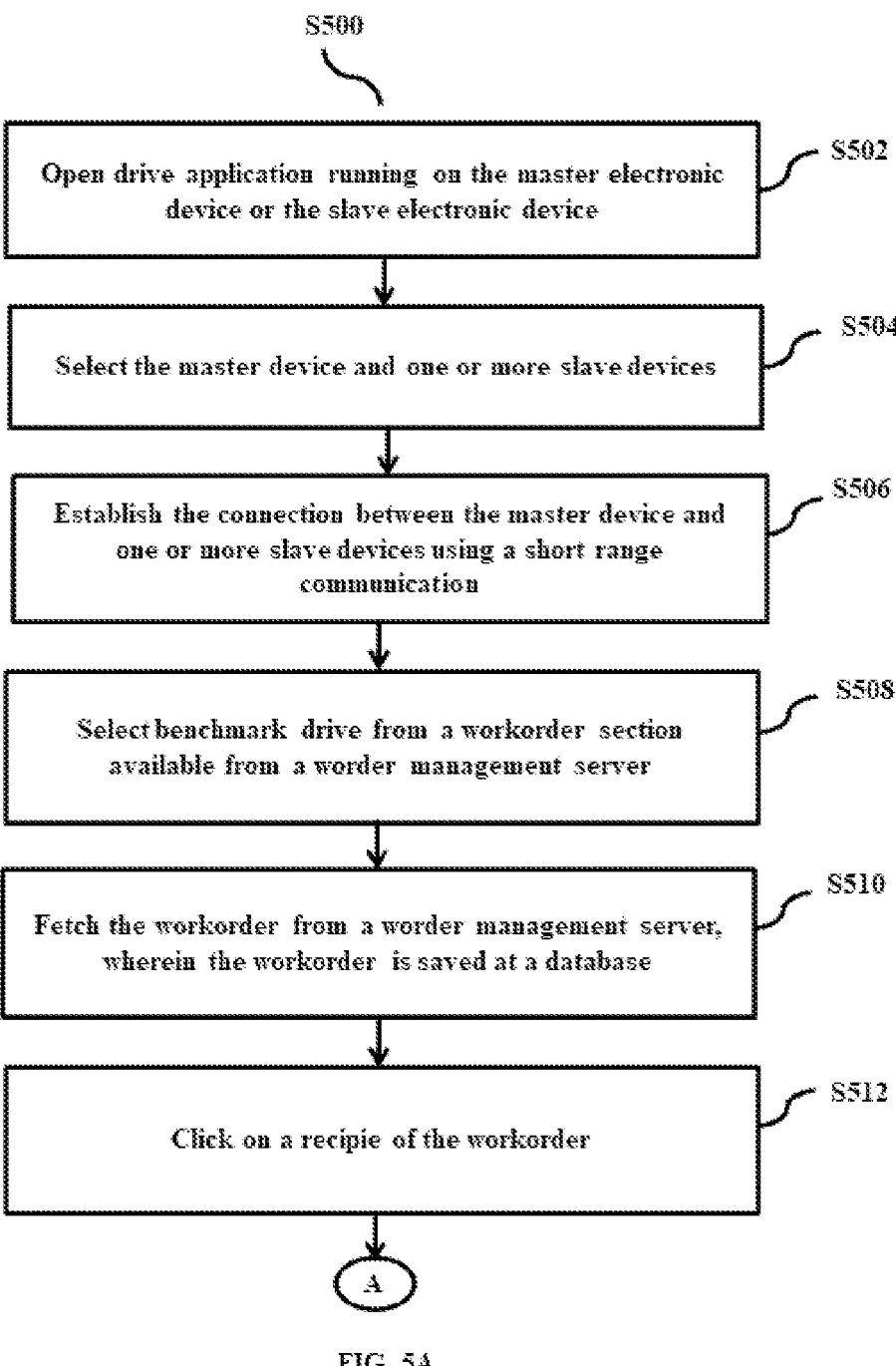

S500

Open drive application running on the master electronic device or the slave electronic device — S502

Select the master device and one or more slave devices — S504

Establish the connection between the master device and one or more slave devices using a short range communication — S506

Select benchmark drive from a workorder section available from a worder management server — S508

Fetch the workorder from a worder management server, wherein the workorder is saved at a database — S510

Click on a recipie of the workorder — S512

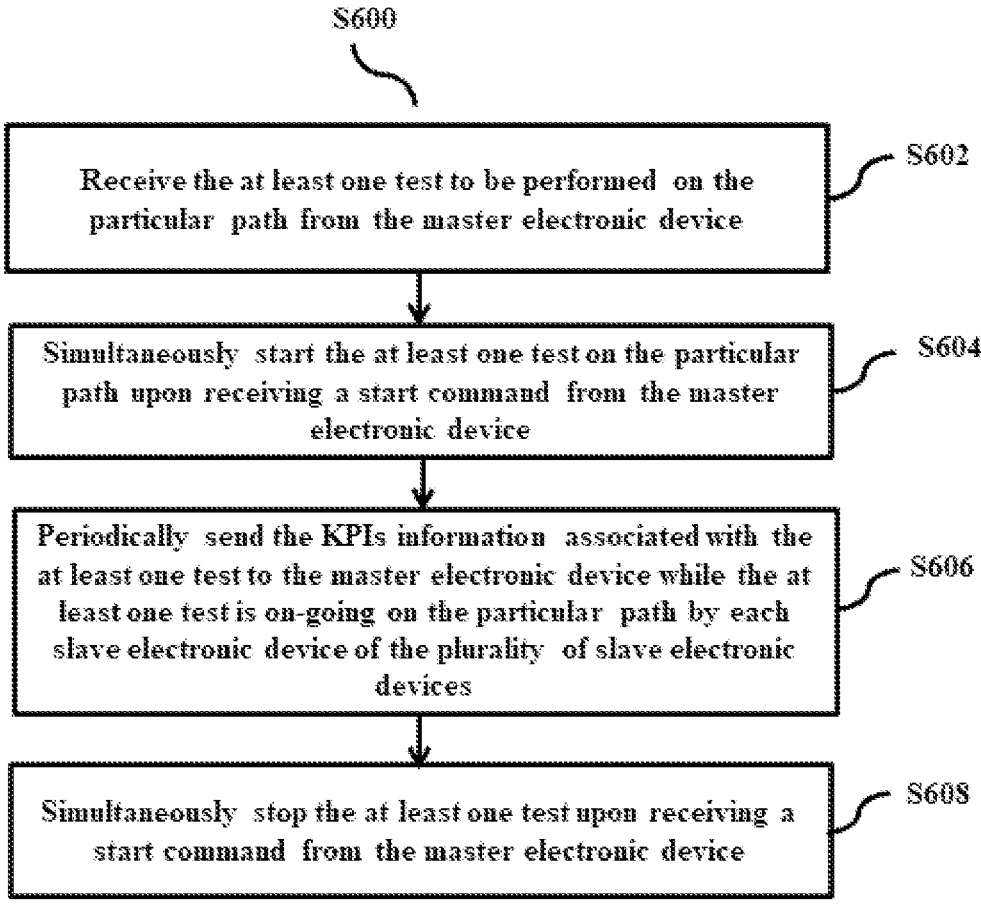

S600

Receive the at least one test to be performed on the particular path from the master electronic device — S602

Simultaneously start the at least one test on the particular path upon receiving a start command from the master electronic device — S604

Periodically send the KPIs information associated with the at least one test to the master electronic device while the at least one test is on-going on the particular path by each slave electronic device of the plurality of slave electronic devices — S606

Simultaneously stop the at least one test upon receiving a start command from the master electronic device — S608

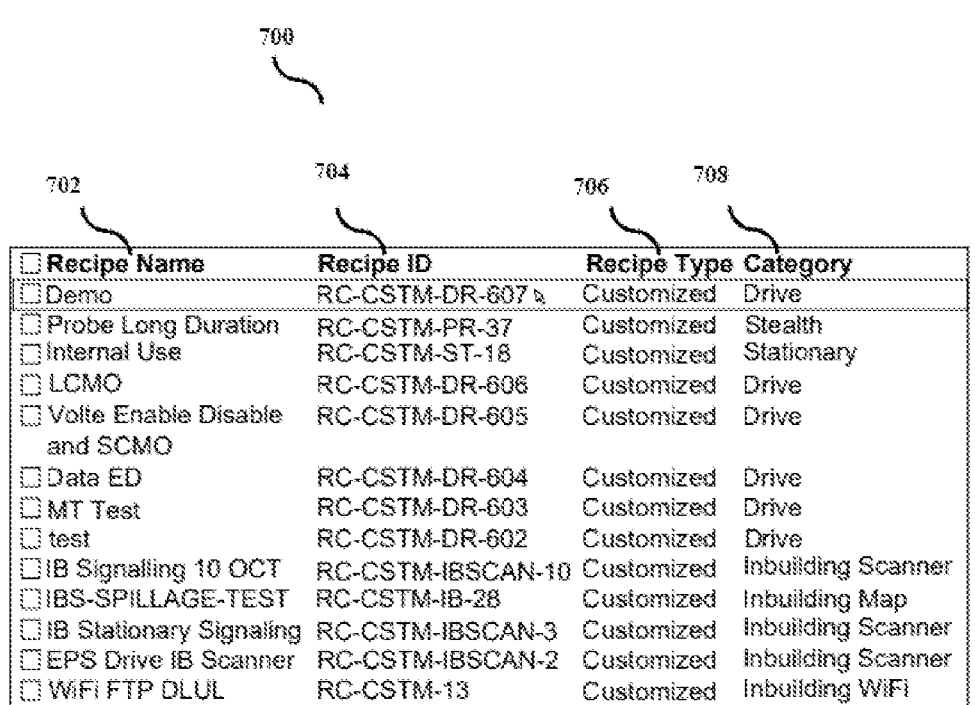

| Recipe Name | Recipe ID | Recipe Type | Category |
|---|---|---|---|
| Demo | RC-CSTM-DR-607 | Customized | Drive |
| Probe Long Duration | RC-CSTM-PR-37 | Customized | Stealth |
| Internal Use | RC-CSTM-ST-18 | Customized | Stationary |
| LCMO | RC-CSTM-DR-606 | Customized | Drive |
| Volte Enable Disable and SCMO | RC-CSTM-DR-605 | Customized | Drive |
| Data ED | RC-CSTM-DR-604 | Customized | Drive |
| MT Test | RC-CSTM-DR-603 | Customized | Drive |
| test | RC-CSTM-DR-602 | Customized | Drive |
| IB Signalling 10 OCT | RC-CSTM-IBSCAN-10 | Customized | Inbuilding Scanner |
| IBS-SPILLAGE-TEST | RC-CSTM-IB-28 | Customized | Inbuilding Map |
| IB Stationary Signaling | RC-CSTM-IBSCAN-3 | Customized | Inbuilding Scanner |
| EPS Drive IB Scanner | RC-CSTM-IBSCAN-2 | Customized | Inbuilding Scanner |
| WiFi FTP DLUL | RC-CSTM-13 | Customized | Inbuilding WiFi |

| All Recipes | Selected Recipes | ❈ | ✿ |
|---|---|---|---|
| Selected 5 of 1,226 → ⊻ | ☐ Demo | | |

Remark: Count: Execution Time: 00:00:00
Wait Time: 00:00:00 DL Threshold (Mbps): 20
UL Threshold (Mbps): 5 DL Criteria (%): 0
UL Criteria (%): 0 Latency Threshold (ms):
Jitter Threshold (ms):

SINR Min: SINR Max: Browse Threshold (ms):

⬦ Download ↖
Threading: 4 File Size: 20 MB Max Throughput:
Average Throughput: Duration: 120 Sec
Protocol: HTTP CA: true

↔ Ping
Count:1 Buffer Size: 32 Bytes
Threshold: Packetloss
URL:www.youtube.com (+2)

| Recipe Name |
|---|
| ☑ Demo (RC-CSTM-DR-607) Drive |
| ☑ Internal Use (RC-CSTM-ST-18) Stationary |
| ☑ LCMO (RC-CSTM-DR-606) Drive |
| ☑ Volte Enable Disable and SCMO(RC-CSTM-DR-605) Drive |
| ☑ Data ED (RC-CSTM-DR-604) Drive |
| ☐ MT Test (RC-CSTM-DR-603) Drive |
| ☐ test (RC-CSTM-DR-602) Drive |
| ☐ Internal Use only (RC-CSTM-DR-601) Drive |
| ☐ Coolpad Testing (RC-CSTM-DR-600) Drive |

⌄ ☐ Internal Use

⌄ ☐ LCMO

FIG. 8

TESTING WIRELESS NETWORK BY USING MASTER-SLAVE DEVICES

CROSS REFERENCE TO RELATED APPLICATIONS

This application is a National Stage of International Application No. PCT/US2022/054118 filed on Dec. 28, 2022, claiming priority based on Indian patent application Ser. No. 202221064597 filed on Nov. 11, 2022.

FIELD OF INVENTION

The present disclosure relates to a wireless network, and more particularly to methods and systems for testing the wireless network by using master-slave devices.

BACKGROUND

In general, a Radio frequency (RF) drive testing is one of the useful elements in establishing a stable network for consumers. A cell tower signal and range measurement are done with multiple solutions. In order to keep network stable and consumer friendly, telecom service providers are spending ample amount of money. When a cluster drive performed, multiple scripts needs to execute on a same path for complete network analysis, in which a user (e.g., RF engineer or the like) has to spend much efforts and it happened that exact path was not captured while redriving on same path for another script. Currently there is no such tool available to perform multiple drives simultaneously through using electronic device (e.g., mobile phone or the like) only.

Thus, it is desired to address the above-mentioned disadvantages or other shortcomings or at least provide a useful alternative.

OBJECT OF INVENTION

The principal object of the embodiments herein is to provide a method and a system for testing a wireless network by using master-slave devices. In the proposed methods, a master electronic device is connected with slave electronic devices. After connection, a user (RF engineer or the like) can assign workorders to the slave electronic devices from the master electronic device and when the test start from the mater electronic device, all the connected slave electronic device start drive execution at the same time. After the test started, the user can check all the slave electronic device signal KPIs as well as ongoing test data on the master electronic device at a time. When the user stops the test from the master electronic device then all the slave electronic device stop the test and share their results to the master electronic device. The user can check the slave electronic devices result on the master electronic device. The method can be used to execute and handle multiple scripts simultaneously for testing the wireless network by using master-slave devices with less time, less effect, low human intervention, less manual efforts, and low cost.

SUMMARY

Accordingly, the embodiment herein is to provide a method for testing a wireless network by using master-slave devices. The method includes establishing, by a master electronic device, a connection with a plurality of slave electronic devices using a short range communication. Further, the method includes allocating, by the master electronic device, at least one test on particular path to be performed by each slave electronic device of the plurality of slave electronic devices. Further, the method includes simultaneously starting, by the master electronic device, the at least one test on each slave electronic device of the plurality of slave electronic devices. Further, the method includes periodically receiving, by the master electronic device, key performance indicators (KPIs) information associated with the at least one test while the at least one test is on-going on the particular path by each slave electronic device of the plurality of slave electronic devices. Further, the method includes displaying, by the master electronic device, the KPIs information associated with the at least one test while the at least one test on the particular path is on-going in each slave electronic device of the plurality of slave electronic devices. Further, the method includes simultaneously stopping, by the master electronic device, the at least one test on each slave electronic device of the plurality of slave electronic devices.

Accordingly, the embodiment herein is to provide a system for testing a wireless network by using master-slave devices. The system includes a workorder management server, a network management server, a plurality of slave devices connected to the network management server, and a master electronic device connected to the workorder management server. The master electronic device includes a memory and a processor. The processor of the master electronic device establishes a connection with a plurality of slave electronic devices using a short range communication. Further, the processor of the master electronic device allocates at least one test on particular path to be performed by each slave electronic device of the plurality of slave electronic devices. Further, the processor of the master electronic device simultaneously starts the at least one test on each slave electronic device of the plurality of slave electronic devices. Further, the processor of the master electronic device periodically receives KPIs information associated with the at least one test while the at least one test is on-going on the particular path by each slave electronic device of the plurality of slave electronic devices. Further, the processor of the master electronic device displays the KPIs information associated with the at least one test while the at least one test on the particular path is on-going in each slave electronic device of the plurality of slave electronic devices. Further, the processor of the master electronic device simultaneously stops the at least one test on each slave electronic device of the plurality of slave electronic devices.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF FIGURES

The method and the system are illustrated in the accompanying drawings, throughout which like reference letters indicate corresponding parts in the various figures. The embodiments herein will be better understood from the following description with reference to the drawings, in which:

FIG. 4 is a flow chart illustrating a method, implemented by the master electronic device, for testing the wireless network by using the master-slave devices, according to the embodiments as disclosed herein;

FIG. 5A-FIG. 5c are example flow charts illustrating a method, implemented by the master electronic device, for testing the wireless network by using the master-slave devices, according to the embodiments as disclosed herein;

FIG. 6 is a flow chart illustrating a method, implemented by the slave electronic device, for testing the wireless network by using the master-slave devices, according to the embodiments as disclosed herein;

FIG. 7 is an example illustration in which a list of recipe is depicted, according to the embodiments as disclosed herein; and FIG. 8 is an example illustration in which one or more recipes selected from the list of recipe is depicted, according to the embodiments as disclosed herein.

DETAILED DESCRIPTION OF INVENTION

Figure 1:
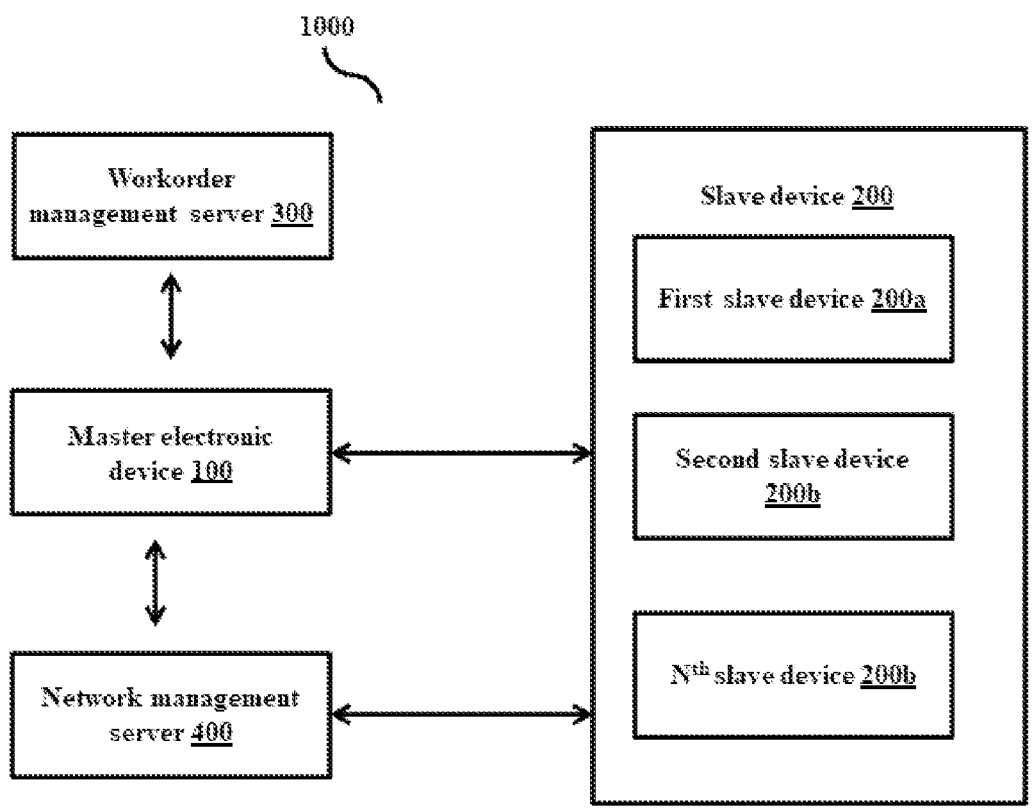
FIG. 1 is an overview of a system for testing a wireless network by using master-slave devices, according to the embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly the embodiment herein is to provide a method for testing a wireless network by using master-slave devices. The method includes establishing, by a master electronic device, a connection with a plurality of slave electronic devices using a short range communication. Further, the method includes allocating, by the master electronic device, at least one test on particular path to be performed by each slave electronic device of the plurality of slave electronic devices. Further, the method includes simultaneously starting, by the master electronic device, the at least one test on each slave electronic device of the plurality of slave electronic devices. Further, the method includes periodically receiving, by the master electronic device, KPIs information associated with the at least one test while the at least one test is on-going on the particular path by each slave electronic device of the plurality of slave electronic devices. Further, the method includes displaying, by the master electronic device, the KPIs information associated with the at least one test while the at least one test on the particular path is on-going in each slave electronic device of the plurality of slave electronic devices. Further, the method includes simultaneously stopping, by the master electronic device, the at least one test on each slave electronic device of the plurality of slave electronic devices.

In the proposed method, the master electronic device is connected with the slave electronic devices. After connection, a user (RF engineer or the like) can assign workorders to the slave electronic devices from the master electronic device and when the test start from the mater electronic device, all the connected slave electronic device start drive execution at the same time. After the test started, the user can check all the slave electronic device signal KPIs as well as ongoing test data on the master electronic device at a time. When the user stops the test from the master electronic device then all the slave electronic device stop the test and share their results to the master electronic device. The user can check the slave electronic devices result on the master electronic device. The method can be used to execute and handle multiple scripts simultaneously for testing the wireless network by using master-slave devices with less time, less effect, low human intervention, less manual efforts, and low cost.

Referring now to the drawings and more particularly to FIGS. 1 through 8, where similar reference characters denote corresponding features consistently throughout the figures, there are shown preferred embodiments.

FIG. 1 is an overview of a system (1000) for testing a wireless network by using master-slave devices, according to the embodiments as disclosed herein. The wireless network can be, for example, but not limited to, a fourth generation network, a fifth generation network, an open radio access network (ORAN) network or the like. In an embodiment, the system (1000) includes a master electronic device (100), a plurality of slave electronic devices (200a-200n), a workorder management server (300) and a network management server (400). Hereafter, the label of the slave electronic device is (200). The plurality of slave devices (200) is connected to the network management server (400) and the master electronic device (100) is connected to the workorder management server (300). The master electronic device (100) and slave electronic device (200) can be, for example, but not limited to a cellular phone, a smart phone, a Personal Digital Assistant (PDA), a tablet computer, a laptop computer, an Internet of Things (IoT), embedded systems, edge devices, a vehicle to everything (V2X) device or the like.

The master electronic device (100) establishes a connection with the plurality of slave electronic devices (200) using a short range communication (e.g., Bluetooth communication, infrared communication, near-field communication, an ultra-band communication, an ultrawide band (UWB) communication, Zigbee or the like). In an embodiment, the master electronic device (100) discovers the plurality of slave electronic devices (200) using the short range communication. Using the short range communication, the master electronic device (100) establishes the connection with the plurality of slave electronic devices (200). The master electronic device (100) stores the information about the plurality of slave electronic devices (200). The master electronic device (100) displays the information about the plurality of slave electronic devices (200) connected to the master electronic device (100).

Further, the master electronic device (100) allocates at least one test on particular path to be performed by each slave electronic device of the plurality of slave electronic devices (200). The test can be, for example, but not limited to a download test, an upload test, an attach operation, a detach operation, a browse operation, a http link validation, a calling operation, a ping operation, a SMS, a video, an application test, a Volte enable operation, a VOLTE disable operation, a packet download operation or the like.

In an embodiment, the master electronic device (100) retrieves a list of workorders from the workorder server (300), wherein each workorder comprises a plurality of recipes and each recipe comprises the at least one test to the performed. The recipe is combination of test which user wants to execute. In an example, a list of recipe (700) is depicted in the FIG. 7. The list of recipe (700) includes various recipe names (702) (e.g., internal use, test, data ED, demo or the like), a recipe ID (704) corresponding to the various recipe names (702), recipe types (706) corresponding to the various recipe names (702) and categories (708) corresponding to the various recipe names (702). One or more recipes (800) selected from the list of recipe is depicted in FIG. 8. In an example, all recipes (802) shown in a left side of a user interface and the selected recipes (804) shown in a right side of the user interface). Further, the master electronic device (100) detects a workorder selected from the list of workorders from a user of the master electronic device (100). Further, the master electronic device (100) assigns one or more recipes of the plurality of recipes from the selected workorder to each slave device of the plurality of slave devices (200).

In an embodiment, the at least one test allocated to all the slave electronic devices (200) is same when a network operator is same for the at least one test to be performed on the particular path. In another embodiment, the at least one test allocated to slave electronic device of the plurality of slave electronic devices (200) is different from each other when the network operator is different for the at least one test to be performed on the particular path. In another embodiment, the at least one test allocated to slave electronic device of the plurality of slave electronic devices (200) is different from each other when the network operator is same for the at least one test to be performed on the particular path.

Further, the master electronic device (100) simultaneously starts the at least one test on each slave electronic device of the plurality of slave electronic devices (200). In an embodiment, the master electronic device (100) receives an input to start the at least one test on each slave electronic device of the plurality of slave electronic devices (200). The master electronic device (100) sends a start command to each slave electronic device of the plurality of slave electronic devices (200). Upon receiving the start command, the at least one test is started simultaneously in each slave electronic device of the plurality of slave electronic devices (200).

Further, the master electronic device (100) periodically receives KPIs information associated with the at least one test while the at least one test is on-going on the particular path by each slave electronic device of the plurality of slave electronic devices (200). The period is defined by the user of the master electronic device (100). Further, the master electronic device (100) displays the KPIs information associated with the at least one test while the at least one test on the particular path is on-going in each slave electronic device of the plurality of slave electronic devices (200).

Further, the master electronic device (100) simultaneously stops the at least one test on each slave electronic device of the plurality of slave electronic devices (200). In an embodiment, the master electronic device (100) receives an input to stop the at least one test on each slave electronic device of the plurality of slave electronic devices (200). The master electronic device (100) sends a stop command to each slave electronic device of the plurality of slave electronic devices (200). Upon receiving the stop command, the at least one test is stopped simultaneously in each slave electronic device of the plurality of slave electronic devices (200).

Further, the master electronic device (100) displays a test result of the at least one test performed on the particular path by each slave electronic device of the plurality of slave electronic devices (200). The test result includes the KPIs information, information about the at least one test, the information about the slave electronic device, and information about the path covered during the at least one test.

Further, the master electronic device (100) receives an input to upload the test result stored at each slave electronic device of the plurality of slave electronic devices (200) to the network management server (400) and sends an upload command to each slave electronic device of the plurality of slave electronic devices (200). The test result is uploaded simultaneously by each slave electronic device of the plurality of slave electronic devices (200) to the network management server (400).

Further, the master electronic device (100) receives the test results uploaded by each slave electronic device of the plurality of slave electronic devices (200). Further, the master electronic device (100) performs a network optimization operation based on the test result. The network optimization operation can be, for example, but not limited to benchmarking an network operator, analysis of network performance, regulating configurations of network devices, and controlling coverage range of network devices.

The slave electronic device (200) receives the at least one test to be performed on the particular path from the master electronic device (100). Further, the slave electronic device (200) simultaneously starts the at least one test on the particular path upon receiving a start command from the master electronic device (100). Further, the slave electronic device (200) periodically sends the KPIs information associated with the at least one test to the master electronic device (100) while the at least one test is on-going on the particular path by each slave electronic device of the plurality of slave electronic devices (200). Further, the slave electronic device (200) simultaneously stops the at least one test upon receiving a start command from the master electronic device (100).

Further, the slave electronic device (200) stores a test result of the at least one test performed on the particular path by each slave electronic device of the plurality of slave electronic devices (200). Further, the slave electronic device (200) receives an upload command from the master electronic device (100) to upload the stored test result to a network management server (400). In response to receiving the upload command form the master electronic device (100), the slave electronic device (200) simultaneously uploads the test result to the network management server (400).

Figure 2:
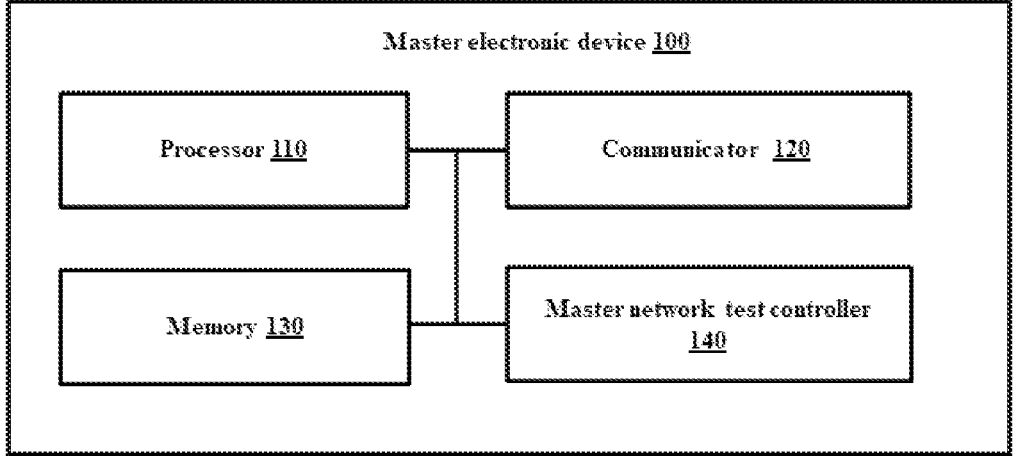
FIG. 2 shows various hardware components of a master electronic device, according to the embodiments as disclosed herein.

FIG. 2 shows various hardware components of the master electronic device (100), according to the embodiments as disclosed herein. In an embodiment, the master electronic device (100) includes a processor (110), a communicator (120), a memory (130) and a master network test controller (140). The processor (110) is coupled with the communicator (120), the memory (130) and the master network test controller (140).

The master network test controller (140) establishes the connection with the plurality of slave electronic devices (200) using the short range communication. In an embodiment, the master network test controller (140) discovers the plurality of slave electronic devices (200) using the short range communication. Using the short range communication, the master network test controller (140) establishes the connection with the plurality of slave electronic devices (200). The master network test controller (140) stores the information about the plurality of slave electronic devices (200) connected to the master electronic device (100). The master network test controller (140) displays the information about the plurality of slave electronic devices (200) connected to the master electronic device (100).

Further, the master network test controller (140) allocates the at least one test on the particular path to be performed by each slave electronic device of the plurality of slave electronic devices (200). In an embodiment, the master network test controller (140) retrieves the list of workorders from the workorder server (300). Each workorder includes a plurality of recipes and each recipe includes the at least one test to the performed. Further, the master network test controller (140) detects the workorder selected from the list of workorders from the user of the master electronic device (100). Further, the master network test controller (140) assigns one or more recipes of the plurality of recipes from the selected workorder to each slave device of the plurality of slave devices.

Further, the master network test controller (140) simultaneously starts the at least one test on each slave electronic device of the plurality of slave electronic devices (200). In an embodiment, the master network test controller (140) receives the input to start the at least one test on each slave electronic device of the plurality of slave electronic devices (200). The master network test controller (140) sends the start command to each slave electronic device of the plurality of slave electronic devices (200). The at least one test is started simultaneously in each slave electronic device of the plurality of slave electronic devices (200) upon receiving the start command.

Further, the master network test controller (140) periodically receives the KPIs information associated with the at least one test while the at least one test is on-going on the particular path by each slave electronic device of the plurality of slave electronic devices (200). Further, the master network test controller (140) displays the KPIs information associated with the at least one test while the at least one test on the particular path is on-going in each slave electronic device of the plurality of slave electronic devices (200).

Further, the master network test controller (140) simultaneously stop the at least one test on each slave electronic device of the plurality of slave electronic devices (200). In an embodiment, the master network test controller (140) receives the input to stop the at least one test on each slave electronic device of the plurality of slave electronic devices (200). the master network test controller (140) sends the stop command to each slave electronic device of the plurality of slave electronic devices (200). The at least one test is stopped simultaneously in each slave electronic device of the plurality of slave electronic devices (200) upon receiving the start command.

Further, the master network test controller (140) displays the test result of the at least one test performed on the particular path by each slave electronic device of the plurality of slave electronic devices (200). Further, the master network test controller (140) receives the input to upload the test result stored at each slave electronic device of the plurality of slave electronic devices (200) to the network management server (400) and sends the upload command to each slave electronic device of the plurality of slave electronic devices (200), wherein the test result is uploaded simultaneously by each slave electronic device of the plurality of slave electronic devices (200) to the network management server (400).

Further, the master network test controller (140) receives the test results uploaded by each slave electronic device of the plurality of slave electronic devices (200). Further, the master network test controller (140) performs a network optimization operation based on the test result.

The master network test controller (140) is implemented by analog and/or digital circuits such as logic gates, integrated circuits, microprocessors, the processor (110), microcontrollers, memory circuits, passive electronic components, active electronic components, optical components, hardwired circuits and the like, and may optionally be driven by firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Although the FIG. 2 shows various hardware components of the master electronic device (100) but it is to be understood that other embodiments are not limited thereon. In other embodiments, the master electronic device (100) may include less or more number of components. Further, the labels or names of the components are used only for illustrative purpose and does not limit the scope of the invention. One or more components can be combined together to perform same or substantially similar function in the master electronic device (100).

Figure 3:
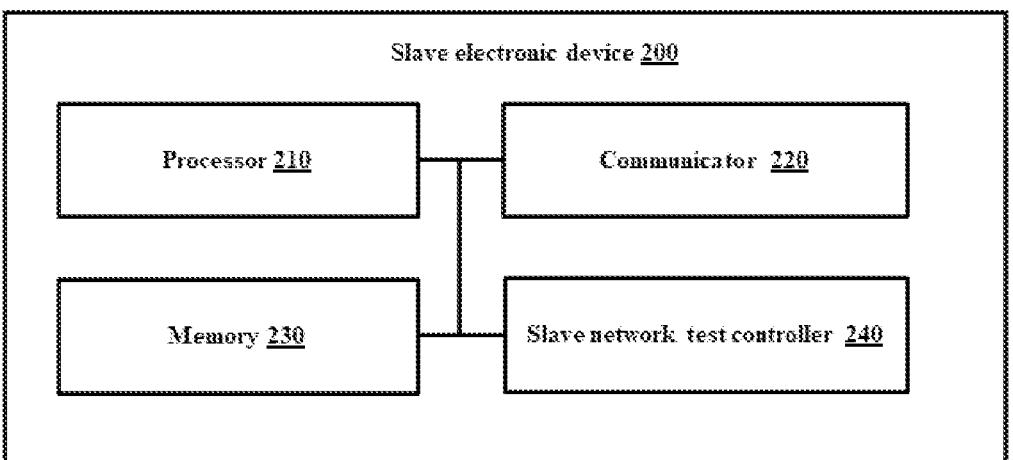
FIG. 3 shows various hardware components of a slave electronic device, according to the embodiments as disclosed herein.

FIG. 3 shows various hardware components of the slave electronic device (200), according to the embodiments as disclosed herein. In an embodiment, the slave electronic device (200) includes a processor (210), a communicator (220), a memory (230) and a slave network test controller (240). The processor (210) is coupled with the communicator (220), the memory (230) and the slave network test controller (240).

The slave network test controller (240) receives the at least one test to be performed on the particular path from the master electronic device (100). Further, the slave network test controller (240) simultaneously starts the at least one test on the particular path upon receiving the start command from the master electronic device (100). Further, the slave network test controller (240) periodically sends the KPIs information associated with the at least one test to the master electronic device (100) while the at least one test is on-going on the particular path by each slave electronic device of the plurality of slave electronic devices (200). Further, the slave network test controller (240) simultaneously stops the at least one test upon receiving the stop command from the master electronic device (100).

Further, the slave network test controller (240) stores the test result of the at least one test performed on the particular path by each slave electronic device of the plurality of slave electronic devices (200).

Further, the slave network test controller (240) receives the upload command from the master electronic device (100) to upload the stored test result to a network management server (400). Further, the slave network test controller (240) simultaneously uploads the test result to the network management server (400) in response to receiving the upload command form the master electronic device (100).

The slave network test controller (240) is implemented by analog and/or digital circuits such as logic gates, integrated circuits, microprocessors, the processor (210), microcontrollers, memory circuits, passive electronic components, active electronic components, optical components, hardwired circuits and the like, and may optionally be driven by firmware.

Further, the processor (210) is configured to execute instructions stored in the memory (230) and to perform various processes. The communicator (220) is configured for communicating internally between internal hardware components and with external devices via one or more networks. The memory (230) also stores instructions to be executed by the processor (210). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Although the FIG. 3 shows various hardware components of the slave electronic device (200) but it is to be understood that other embodiments are not limited thereon. In other embodiments, the slave electronic device (200) may include less or more number of components. Further, the labels or names of the components are used only for illustrative purpose and does not limit the scope of the invention. One or more components can be combined together to perform same or substantially similar function in the slave electronic device (200).

FIG. 4 is a flow chart (S400) illustrating a method, implemented by the master electronic device (100), for testing the wireless network by using master-slave devices, according to the embodiments as disclosed herein. The operations (S402-S412) are handled by the master network test controller (140).

At S402, the method includes establishing the connection with the plurality of slave electronic devices (200) using the short range communication. At S404, the method includes allocating the at least one test on the particular path to be performed by each slave electronic device of the plurality of slave electronic devices (200). At S406, the method includes simultaneously starting the at least one test on each slave electronic device of the plurality of slave electronic devices (200). At S408, the method includes periodically receiving the KPIs information associated with the at least one test while the at least one test is on-going on the particular path by each slave electronic device of the plurality of slave electronic devices (200). At S410, the method includes displaying the KPIs information associated with the at least one test while the at least one test on the particular path is on-going in each slave electronic device of the plurality of slave electronic devices (200). At S412, the method includes simultaneously stopping the at least one test on each slave electronic device of the plurality of slave electronic devices (200).

In the proposed method, the master electronic device (100) is connected with the slave electronic devices (200). After connection, the user (RF engineer or the like) can assign workorders to the slave electronic devices (200) from the master electronic device (100). When the test start from the mater electronic device (100), all the connected slave electronic device (200) start drive execution at the same time. After the test started, the user can check all the slave electronic device signal KPIs as well as ongoing test data on the master electronic device (100) at a time. When the user stops the test from the master electronic device (100) then all the slave electronic devices stop the test and share their results to the master electronic device (100). The user can check the slave electronic devices (200) result on the master electronic device (100). The method can be used to execute and handle multiple scripts simultaneously for testing the wireless network by using master-slave devices with less time, less effect, low human intervention, less manual efforts, and low cost.

Figure 5B:
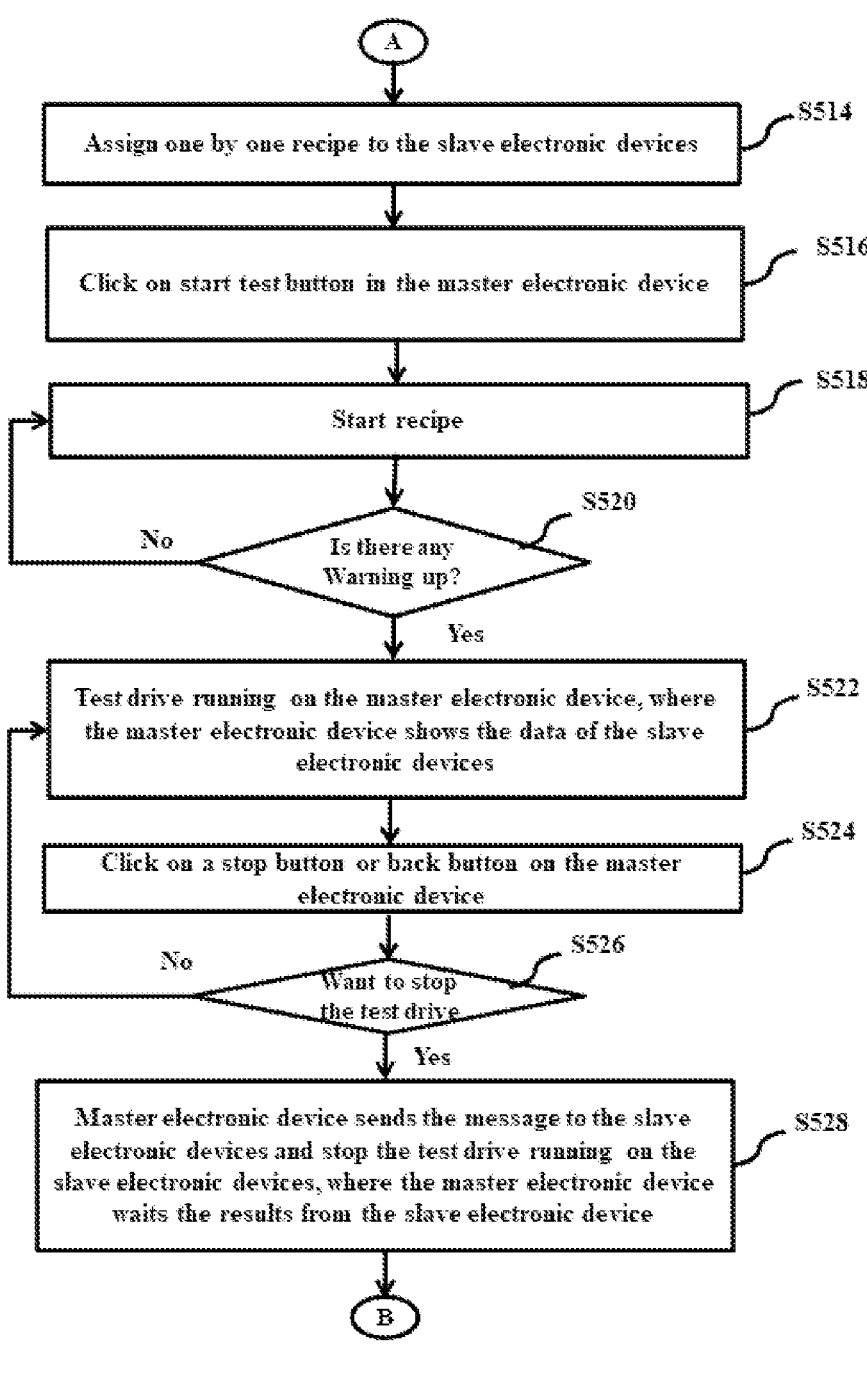
Figure 5C:
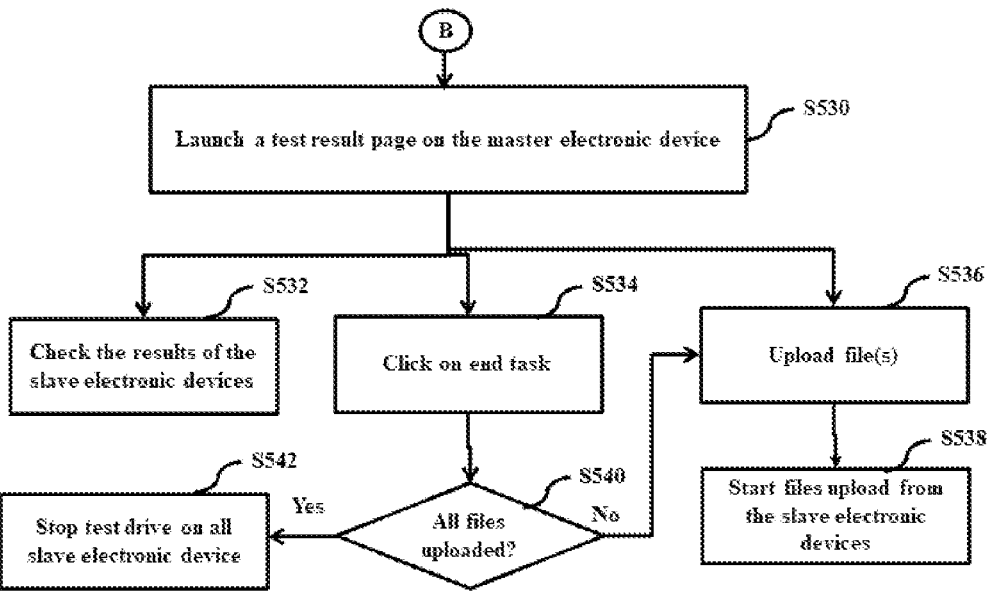

FIG. 5A-FIG. 5c are example flow charts (S500) illustrating a method, implemented by the master electronic device (100), for testing the wireless network by using master-slave devices, according to the embodiments as disclosed herein. The operations (S502-S542) are handled by the master network test controller (140).

At S502, the method includes opening the drive application running on the master electronic device (100) or the slave electronic device (200). At S504, the method includes selecting the master electronic device (100) and the one or more slave electronic devices (200). At S506, the method includes establishing the connection between the master electronic device (100) and the one or more slave electronic devices (200) using the short range communication. At S508, the method includes selecting a benchmark drive from the workorder section available from the worder management server (300). At S510, the method includes fetching the workorder from the worder management server (300), wherein the workorder is saved at a database (not shown). At S512, the method includes clicking on the recipe of the workorder.

At S514, the method includes assigning the one by one recipe to the slave electronic devices (200). At S516, the method includes clicking on a start test button in the master electronic device (100). At S518, the method includes starting the recipe. At S520, the method includes determining whether warning up is there? If warning up is not there, then the method again performs the operation S518.

If warning up is there then, at S522, the method includes testing the drive running on the master electronic device (100), where the master electronic device (100) shows the data of the slave electronic devices (200). At S524, the method includes clicking on a stop button or a back button on the master electronic device (100). At S526, the method includes determining whether the test drive is stopped? If the test drive is not stopped then, then the method again performs the operation S522. If the test drive is stopped then, at S528, the master electronic device (100) sends the message to the slave electronic devices (200) and stops the test drive running on the slave electronic devices (200), where the master electronic device (100) waits the results from the slave electronic device (200).

At S530, the method includes launching the test result page on the master electronic device (100). At S532, the method includes checking the results of the slave electronic devices (200). At S534, the method includes clicking on the end task. At S536, the method includes upload the file upon clicking on the end task. At S538, the method includes starting the files upload from the slave electronic devices (200). At S540, the method includes determining whether all files are uploaded? If all files are not uploaded then, at S536, the method includes upload the files. If all files are uploaded then, At S542, the method includes stopping the test drive on all slave electronic device (200).

FIG. 6 is a flow chart (600) illustrating a method, implemented by the slave electronic device (200), for testing the wireless network by using master-slave devices, according to the embodiments as disclosed herein. The operations (S602-S608) are handled by the slave network test controller (240).

At S602, the method includes receiving the at least one test to be performed on the particular path from the master electronic device (100). At S604, the method includes simultaneously starting the at least one test on the particular path upon receiving the start command from the master electronic device (100). At S606, the method includes periodically sending the KPIs information associated with the at least one test to the master electronic device (100) while the at least one test is on-going on the particular path by each slave electronic device of the plurality of slave electronic devices (200). At S608, the method includes simultaneously stopping the at least one test upon receiving a stop command from the master electronic device (100).

The various actions, acts, blocks, steps, or the like in the flow charts (S400-S600) may be performed in the order presented, in a different order or simultaneously. Further, in some embodiments, some of the actions, acts, blocks, steps, or the like may be omitted, added, modified, skipped, or the like without departing from the scope of the invention.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:

1. A system for testing a wireless network by using master-slave devices, wherein the system comprises:
    a workorder management server;
    a network management server;
    a plurality of slave devices connected to the network management server; and
    a master electronic device connected to the workorder management server, wherein the master electronic device comprises a memory and a processor that:
    establishes a connection with a plurality of slave electronic devices using a short range communication;
    allocates at least one test on particular path to be performed by each slave electronic device of the plurality of slave electronic devices;
    simultaneously starts the at least one test on each slave electronic device of the plurality of slave electronic devices;
    periodically receives key performance indicators (KPIs) information associated with the at least one test while the at least one test is on-going on the particular path by each slave electronic device of the plurality of slave electronic devices;
    displays the KPIs information associated with the at least one test while the at least one test on the particular path is on-going in each slave electronic device of the plurality of slave electronic devices; and
    simultaneously stop the at least one test on each slave electronic device of the plurality of slave electronic devices.

2. The system as claimed in claim 1, wherein the processor:
    displays a test result of the at least one test performed on the particular path by each slave electronic device of the plurality of slave electronic devices, wherein the test result comprises the KPIs information, information about the at least one test, the information about the slave electronic device, and information about the path covered during the at least one test;
    receives an input to upload the test result stored at each slave electronic device of the plurality of slave electronic devices to the network management server; and
    sends an upload command to each slave electronic device of the plurality of slave electronic devices, wherein the test result is uploaded simultaneously by each slave electronic device of the plurality of slave electronic devices to the network management server.

3. The system as claimed in claim 2, wherein the processor:

receives the test results uploaded by each slave electronic device of the plurality of slave electronic devices; and performs a network optimization operation based on the test result, wherein the network optimization operation comprises at least one of benchmarking an network operator, analysis of network performance, regulating configurations of network devices, and controlling coverage range of network devices.

4. The system as claimed in claim 1, wherein simultaneously start the at least one test on each slave electronic device of the plurality of slave electronic devices comprises:

receive an input to start the at least one test on each slave electronic device of the plurality of slave electronic devices; and send a start command to each slave electronic device of the plurality of slave electronic devices, wherein the at least one test is started simultaneously in each slave electronic device of the plurality of slave electronic devices upon receiving the start command.

5. The system as claimed in claim 1, wherein simultaneously stop the at least one test on each slave electronic device of the plurality of slave electronic devices comprises:

receive an input to stop the at least one test on each slave electronic device of the plurality of slave electronic devices; and send a stop command to each slave electronic device of the plurality of slave electronic devices, wherein the at least one test is stopped simultaneously in each slave electronic device of the plurality of slave electronic devices upon receiving the start command.

6. The system as claimed in claim 1, wherein allocate the at least one test to be performed by each slave electronic device of the plurality of slave electronic devices comprises:

retrieve a list of workorders from the workorder server, wherein each workorder comprises a plurality of recipes and wherein each recipe comprises the at least one test to the performed;

detect a workorder selected from the list of workorders from a user of the master electronic device; and assign one or more recipes of the plurality of recipes from the selected workorder to each slave device of the plurality of slave devices.

7. The system as claimed in claim 1, wherein establish the connection with the plurality of slave electronic devices using the short range communication comprises:

discover the plurality of slave electronic devices using the short range communication;

establish the connection with the plurality of slave electronic devices using the short range communication;

store the information about the plurality of slave electronic devices connected to the master electronic device; and display the information about the plurality of slave electronic devices connected to the master electronic device.

8. The system as claimed in claim 1, wherein the at least one test allocated to all the slave electronic devices is same when a network operator is same for the at least one test to be performed on the particular path.

9. The system as claimed in claim 1, wherein the at least one test allocated to slave electronic device of the plurality of slave electronic devices is different from each other when the network operator is different for the at least one test to be performed on the particular path.

10. The system as claimed in claim 1, wherein the at least one test allocated to slave electronic device of the plurality of slave electronic devices is different from each other when the network operator is same for the at least one test to be performed on the particular path.

11. The system as claimed in claim 1, wherein the each of the slave electronic devices comprises:

a memory, and a processor that:

receives the at least one test to be performed on the particular path from the master electronic device;

simultaneously starts the at least one test on the particular path upon receiving a start command from the master electronic device;

periodically sends the KPIs information associated with the at least one test to the master electronic device while the at least one test is on-going on the particular path by each slave electronic device of the plurality of slave electronic devices; and simultaneously stops the at least one test upon receiving a start command from the master electronic device.

12. The system as claimed in claim 1, wherein simultaneously start the at least one test on the particular path upon receiving a start command from the master electronic device comprises:

detect whether each device is ready to start the at last one test; and simultaneously start the at least one test on the particular path once when all the plurality of slave electronic devices are ready to start the at least one test.

13. The system as claimed in claim 1, wherein the processor:

stores a test result of the at least one test performed on the particular path by each slave electronic device of the plurality of slave electronic devices, wherein the test result comprises the KPIs information, information about the at least one test, the information about the slave electronic device, and information about the path covered during the at least one test;

receives an upload command from the master electronic device to upload the stored test result to a network management server; and simultaneously uploads the test result to the network management server in response to receiving the upload command form the master electronic device.

14. A method for testing a wireless network by using master-slave devices, wherein the method comprises:

establishing, by a master electronic device, a connection with a plurality of slave electronic devices using a short range communication;

allocating, by the master electronic device, at least one test on a particular path to be performed by each slave electronic device of the plurality of slave electronic devices;

simultaneously starting, by the master electronic device, the at least one test on each slave electronic device of the plurality of slave electronic devices;

periodically receiving, by the master electronic device, key performance indicators (KPIs) information associated with the at least one test while the at least one test is on-going on the particular path by each slave electronic device of the plurality of slave electronic devices;

displaying, by the master electronic device, the KPIs information associated with the at least one test while the at least one test on the particular path is on-going in each slave electronic device of the plurality of slave electronic devices; and simultaneously stopping, by the master electronic device, the at least one test on each slave electronic device of the plurality of slave electronic devices.

15. The method as claimed in claim 14, wherein the method comprises: displaying, by the master electronic device, a test result of the at least one test performed on the particular path by each slave electronic device of the plurality of slave electronic devices, wherein the test result comprises the KPIs information, information about the at least one test, the information about the slave electronic device, and information about the path covered during the at least one test; receiving, by the master electronic device, an input to upload the test result stored at each slave electronic device of the plurality of slave electronic devices to a network management server; and sending, by the master electronic device, an upload command to each slave electronic device of the plurality of slave electronic devices, wherein the test result is uploaded simultaneously by each slave electronic device of the plurality of slave electronic devices to the network management server.

16. The method as claimed in claim 15, wherein simultaneously starting, by the master electronic device, the at least one test on each slave electronic device of the plurality of slave electronic devices comprises:

receiving, by the master electronic device, an input to start the at least one test on each slave electronic device of the plurality of slave electronic devices; and sending, by the master electronic device, a start command to each slave electronic device of the plurality of slave electronic devices, wherein the at least one test is started simultaneously in each slave electronic device of the plurality of slave electronic devices upon receiving the start command.

17. The method as claimed in claim 15, wherein simultaneously stopping, by the master electronic device, the at least one test on each slave electronic device of the plurality of slave electronic devices comprises:

receiving, by the master electronic device, an input to stop the at least one test on each slave electronic device of the plurality of slave electronic devices; and sending, by the master electronic device, a stop command to each slave electronic device of the plurality of slave electronic devices, wherein the at least one test is stopped simultaneously in each slave electronic device of the plurality of slave electronic devices upon receiving the stop command.

18. The method as claimed in claim 15, wherein allocating, by the master electronic device, the at least one test to be performed by each slave electronic device of the plurality of slave electronic devices comprises:

retrieving, by the master electronic device, a list of workorders from a workorder server, wherein each workorder comprises a plurality of recipes and wherein each recipe comprises the at least one test to the performed;

detecting, by the master electronic device, a workorder selected from the list of workorders from a user of the master electronic device; and assigning, by the master electronic device, one or more recipes of the plurality of recipes from the selected workorder to each slave device of the plurality of slave devices.

19. The method as claimed in claim 15, wherein establishing, by the master electronic device, the connection with the plurality of slave electronic devices using the short range communication comprises:

discovering, by the master electronic device, the plurality of slave electronic devices comprising a test drive application using the short range communication;

establishing, by the master electronic device, the connection with the plurality of slave electronic devices using the short range communication; storing, by the master electronic device, the information about the plurality of slave electronic devices connected to the master electronic device; and displaying, by the master electronic device, the information about the plurality of slave electronic devices connected to the master electronic device.

20. The method as claimed in claim 15, wherein the method comprises:

receiving, by each slave electronic device of the plurality of slave electronic devices, the at least one test to be performed on the particular path from the master electronic device;

simultaneously starting, by each slave electronic device of the plurality of slave electronic devices, the at least one test on the particular path upon receiving a start command from the master electronic device;

periodically sending, by each slave electronic device of the plurality of slave electronic devices, the KPIs information associated with the at least one test to the master electronic device while the at least one test is on-going on the particular path by each slave electronic device of the plurality of slave electronic devices;

simultaneously stopping, by each slave electronic device of the plurality of slave electronic devices, the at least one test upon receiving a start command from the master electronic device;

storing, by each slave electronic device of the plurality of slave electronic devices, a test result of the at least one test performed on the particular path by each slave electronic device of the plurality of slave electronic devices, wherein the test result comprises the KPIs information, information about the at least one test, the information about the slave electronic device, and information about the path covered during the at least one test receiving, by each slave electronic device of the plurality of slave electronic devices, an upload command from the master electronic device to upload the stored test result to a network management server; and simultaneously uploading, by each slave electronic device of the plurality of slave electronic devices, the test result to the network management server in response to receiving the upload command form the master electronic device.

* * * * *